United States Patent
Yelles

(10) Patent No.: US 7,357,176 B2
(45) Date of Patent: Apr. 15, 2008

(54) METHOD AND APPARATUS FOR CONTROLLING MIXTURE OF FRESH AND RECIRCULATED AIR IN A VEHICLE

(75) Inventor: Daniel Yelles, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 606 days.

(21) Appl. No.: 10/970,521

(22) Filed: Oct. 21, 2004

(65) Prior Publication Data
US 2006/0086495 A1 Apr. 27, 2006

(51) Int. Cl.
B60H 1/00 (2006.01)
(52) U.S. Cl. .................... 165/271; 165/202; 62/133
(58) Field of Classification Search ............... 165/202, 165/203, 204, 271, 43; 62/133, 244; 701/104, 701/93
See application file for complete search history.

(56) References Cited

U.S. PATENT DOCUMENTS

| | | | |
|---|---|---|---|
| 3,394,754 A | | 7/1968 | Schneeberg et al. |
| 5,133,302 A | | 7/1992 | Yamada et al. |
| 5,337,802 A | | 8/1994 | Kajino et al. |
| 5,516,041 A | * | 5/1996 | Davis et al. ................... 165/43 |
| 6,330,909 B1 | | 12/2001 | Takahashi et al. |
| 6,371,202 B1 | | 4/2002 | Takano et al. |
| 6,793,016 B2 | | 9/2004 | Aoki et al. |
| 2006/0064232 A1 | * | 3/2006 | Ampunan et al. .......... 701/104 |

FOREIGN PATENT DOCUMENTS

JP 4128511 4/1992

* cited by examiner

Primary Examiner—Ljiljana Ciric
(74) Attorney, Agent, or Firm—Rankin, Hill & Clark LLP; Mark E. Duell

(57) ABSTRACT

A blower system and method of operation for a vehicle air conditioning system, including a blower case for receiving air to be circulated into a vehicle cabin, with first and second dampers, for varying between a recirculation position for recirculating vehicle cabin air and a fresh position for introduction of fresh air from outside the vehicle. If a calculated outlet temperature is below a first temperature, a control system opens both dampers to a recirculation position. If the calculated outlet temperature is between the first temperature and a higher second temperature, the control system opens either the first or second damper to a fresh position, and opens the other damper to a recirculation position or the fresh position based upon relative humidity and vehicle speed. If the calculated outlet temperature is higher than the second temperature, the first and second dampers are both opened to the fresh position.

13 Claims, 7 Drawing Sheets

METHOD AND APPARATUS FOR CONTROLLING MIXTURE OF FRESH AND RECIRCULATED AIR IN A VEHICLE

BACKGROUND OF THE INVENTION

1. Field of the Invention

The present invention is directed to the field of air conditioning systems, particularly vehicle air conditioning systems.

2. Description of Related Art

Vehicles are commonly equipped with air conditioning systems so as to provide comfort to the vehicle's driver and passengers on hot summer days. An air conditioning system includes an air compressor which is powered by the vehicle's motor, for driving a highly-volatile refrigerant through a system that includes a condenser, an expansion valve and an evaporator, as is well known. In a typical vehicle air conditioning system, fresh outside air is brought into the system and cooled down, after which it is blown into the vehicle cabin.

Several conditions influence the performance and efficiency of an air conditioning system, such as ambient temperature and humidity. Under hot, humid ambient conditions, the air conditioning system performs work to cool down and remove moisture from the fresh air to obtain a desired temperature and humidity within the vehicle. This fresh air is continually being added to the already-cooled air in the vehicle cabin. Since air is continually flowing in, the air conditioning system creates a positive pressure within the vehicle cabin, and so the already-cooled and dried air is continually seeping out of the vehicle cabin, resulting in air cooling losses. Thus, the air conditioning must perform constant work just to maintain a desired level of temperature and humidity within the vehicle cabin.

However, a vehicle air conditioning system is powered by the vehicle engine, and so the increased operation of the air conditioning system contributes to the engine load, which results in the consumption of additional fuel, thereby reducing fuel efficiency. It has therefore been previously contemplated to recirculate the already-cooled air in the vehicle cabin into the air conditioning system. This approach maintains the temperature and humidity level of already-cooled air, and reduces the cabin air cooling losses, and thereby reduces the load of fresh air coming into the system. As shown in FIG. 1A, a typical air conditioner blower case 10 of this type operates in a "fresh air" mode where a first damper 12 and a second damper 14 are both opened to a first position to allow fresh air from outside the vehicle cabin to enter the blower case 10. Incoming fresh air flows past the dampers 12, 14, through a subjacent filter 17, and the blower fan 16, and into the passenger compartment. In a "recirculation" mode, as shown in FIG. 1B, the first damper 12 and second damper 14 are both opened to a second position to allow air from inside the vehicle cabin to be drawn into the blower case 10 and through the filter 17 by the blower fan 16, and then returned to the passenger compartment. When the dampers 12, 14 are in this second position, they make contact with a rail 18, formed in the top of the blower case 10. The rail 18 insures an air-tight seal against the fresh air coming in from the outside the vehicle, and only allows vehicle cabin air to recirculate into the blower case 10. However, the rail 18 is spaced vertically from the filter 17, and does not serve to effectively separate the two incoming air streams. While this is not a problem when the both dampers are in the fresh or recirculation positions, this lack of separation of the two incoming air streams makes it practically impossible to have a partial recirculation of cabin air.

With standards and regulations governing clean air and fuel conservation, it is highly desirable to reduce fuel consumption wherever possible, particularly if this goal can be attained without a reduction in performance or end-user expectations. It would be highly desirable to control the amount of recirculated air, and/or provide a mixture of recirculated and fresh air, for the purpose of reducing air cooling losses under a variety of ambient environmental conditions. However, it has heretofore not been possible to selectively control quantities of recirculated and fresh air. For example, in the known system shown in FIGS. 1A and 1B, if vehicle cabin air is recirculated into the blower case 10 by opening one damper to the second position (recirculation) while the other damper is in the first position (fresh) when the vehicle is moving quickly, the fresh air flow produced by the vehicle's motion is much more powerful than the blower fan 16, thereby swamping out the recirculation air flow. More specifically, due to the lack of a sealing connection between the blower box and the filter 17, the incoming fresh air stream is not isolated or contained to the subjacent portion of ht filter, but rather flows under the rail 18 and flows through the entire filter surface. Therefore, in the prior art it is very difficult to control the flow of fresh air and the benefit of the recirculated air is not obtained.

Moreover, partial recirculation (i.e., returning air to the cabin consisting of a portion of fresh air and a portion of recirculated air) is not possible in the prior art construction.

SUMMARY OF THE INVENTION

The difficulties and drawbacks associated with previous systems are overcome by the blower system for a vehicle air conditioning system and method of operation, in accordance with the present invention. The present system includes a blower case for receiving air to be circulated into a vehicle cabin, with first and second dampers, each for selectively varying between a recirculation position for recirculating vehicle cabin air into the blower case and a fresh position for introduction of fresh air from outside the vehicle into the blower case. An implementation is provided for calculating an outlet temperature of a vehicle air conditioning system. A control system is provided for moving the first and second dampers in response to the calculated outlet temperature.

The control system moves the first and second dampers between a first or fresh position for introduction of fresh air from outside the vehicle into the blower case, and moves the other damper to a second or recirculation position, so as to recirculate vehicle cabin air back into the blower case.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE INVENTION

Figure 1A:
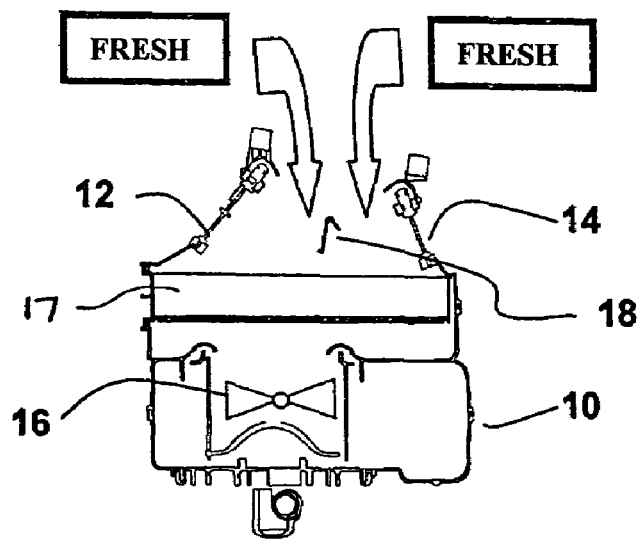
FIGS. 1A and 1B depict a standard method for selecting between fresh air and recirculated air in a vehicle air conditioning system.
Figure 1B:
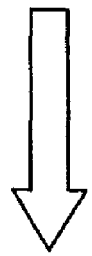
Figure 1B:
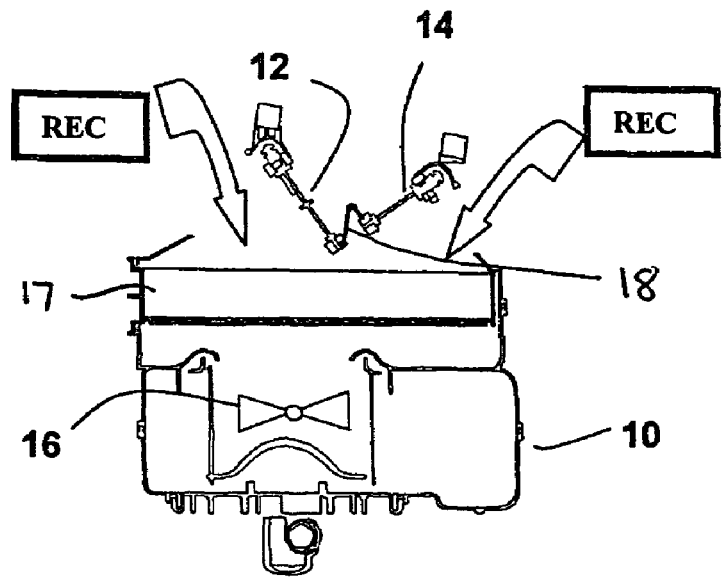
Figures 2A, 2B, 2C:
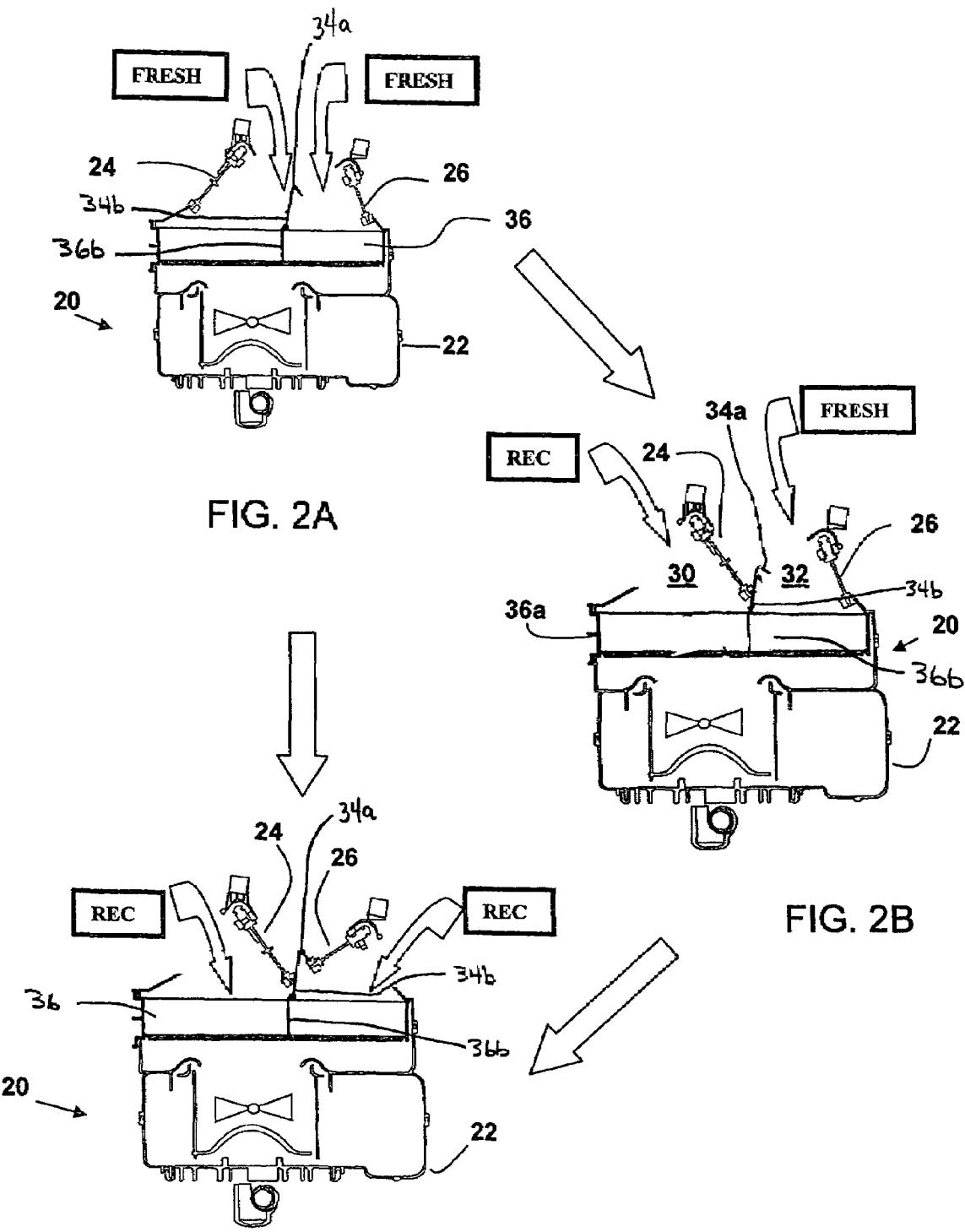
FIGS. 2A, 2B, 2C and 2D depict a blower case arrangement and method for selecting between fresh air and recirculated air and also providing a controlled mixture thereof in a vehicle air conditioning system, in accordance with the present invention.
Figure 2D:
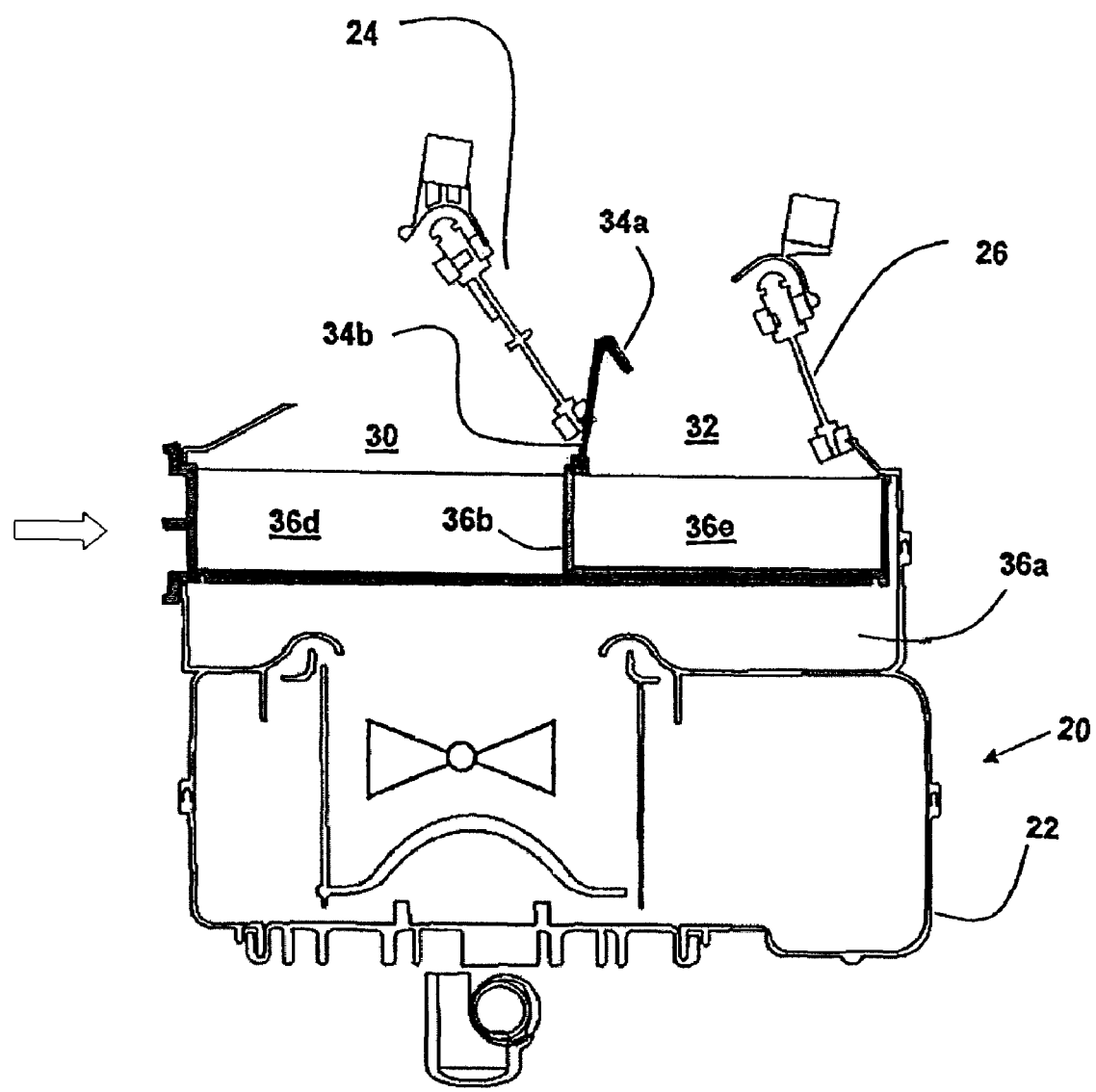

As shown for example, FIGS. 2A-2D, a blower system 20 for a vehicle air conditioning system is disclosed. A blower case 22 is provided for receiving air to be circulated into a vehicle cabin. A first damper 24 is pivotally mounted to the blower case 22 for movement between a recirculation position for recirculating vehicle cabin air into the blower case 22 and a fresh position for introduction of fresh air from outside the vehicle into the blower case. A second damper 26 is also pivotally mounted to the blower case 22 for movement between a recirculation position for recirculating vehicle cabin air into the blower case 22 and a fresh position for introduction of fresh air from outside the vehicle into the blower case 22. The first and second dampers 24, 26 are shown in the first or fresh position in FIG. 2A and in the second or recirculation position in FIG. 2C. In FIG. 2B, the first damper 24 is in the second or recirculation position while the second damper 26 is in the first or fresh position. It should be appreciated that the dampers 24, 26 are preferably moved between the fresh and recirculation positions using computer-controlled electronic actuators, though any other suitable arrangement can be implemented without departing from the invention.

The blower case 22 also includes a first access port 30 for receiving a first air stream into the blower case 22. A second access port 32 is provided for receiving a second air stream into the blower case 22. The first and second dampers 24, 26 respectively regulate access to the first and second access ports 30, 32 between the recirculation and fresh positions. As best shown in the detail view of FIG. 2D, a rail 34a is used to provide a sealing surface for the dampers 24, 26. The rail 34a includes a sealing member 34b for sealing off the first and second access ports 30, 32, thereby providing fluid separation between the first and second air streams.

An air filter 36a is provided relatively beneath the dampers 24, 26 and rail 34a. As indicated by the arrow, the filter 36a slides in through the side of the blower case 22, so as to be inserted in a direction transverse to the air flow. The air filter 36a includes a corresponding seal 36b that makes contact with the sealing member 34b of the rail 34a, to help further maintain separation of the air streams.

The air filter seal 36b preferably extends from a top of the air filter 36a, at which point the seal 36b sealingly engages the lower end of the rail sealing member 34b, to a bottom surface of the air filter 36a, and thereby effectively divides or separates the air filter 36a into two air filter sections. By this construction, the incoming air streams are kept separated from one another until passing through the filter 36a, as described more fully hereinafter. In this way, the recirculation air can be introduced into the blower case 22 without being swamped out by the greater flow of fresh air resulting from the movement of the vehicle.

As a result of the blower system structure disclosed above, the present blower system 20 allows a method of partial recirculation of the vehicle cabin air, where a portion of fresh air is drawn in and mixed with a recirculated portion of the vehicle cabin air, as shown in FIGS. 2A, 2B and 2C. This is done so as to efficiently manage the level of temperature and humidity in response to a user's preferences, as will be set forth in detail below. The first access port 30 is preferably configured so as to be a primary recirculated air port, so that this port 30 is relied upon to receive the majority of the recirculated air from the vehicle cabin. The second access port 32 is configured so as to be a primary fresh air port, so that this port 32 is relied upon to receive the majority of the outside fresh air.

In order to control the flow of fresh outside air, the first and second access ports 30, 32 are configured to allow a greater flow of recirculated air into the blower case 22. As especially shown in FIG. 2D, the primary recirculated air port 30 is a relatively larger port, and wherein the primary fresh air port 32 is relatively smaller than the primary recirculated air port 30. Also, the air filter 36a includes a first filter section 36d and a second filter section 36e, divided or separated by the sealing member 36b, as described hereinbefore. The first filter section 36d cooperates with, and receives air from, the primary recirculated air port 30, while the second filter section 36e cooperates with, and receives air from, the primary fresh air port 32. Thus, the first filter section 36d is larger than the second filter section 36e, so as to provide a relatively larger fluid aperture for recirculated air flow and a smaller fluid aperture for the higher-pressure fresh air flow, and thereby restrict the volume of fresh air. In this way, the flow of high-pressure fresh air into the blower case 22 is reduced to a desired level, allowing a greater level of flow through the primary recirculated air port 30.

Figure 3:
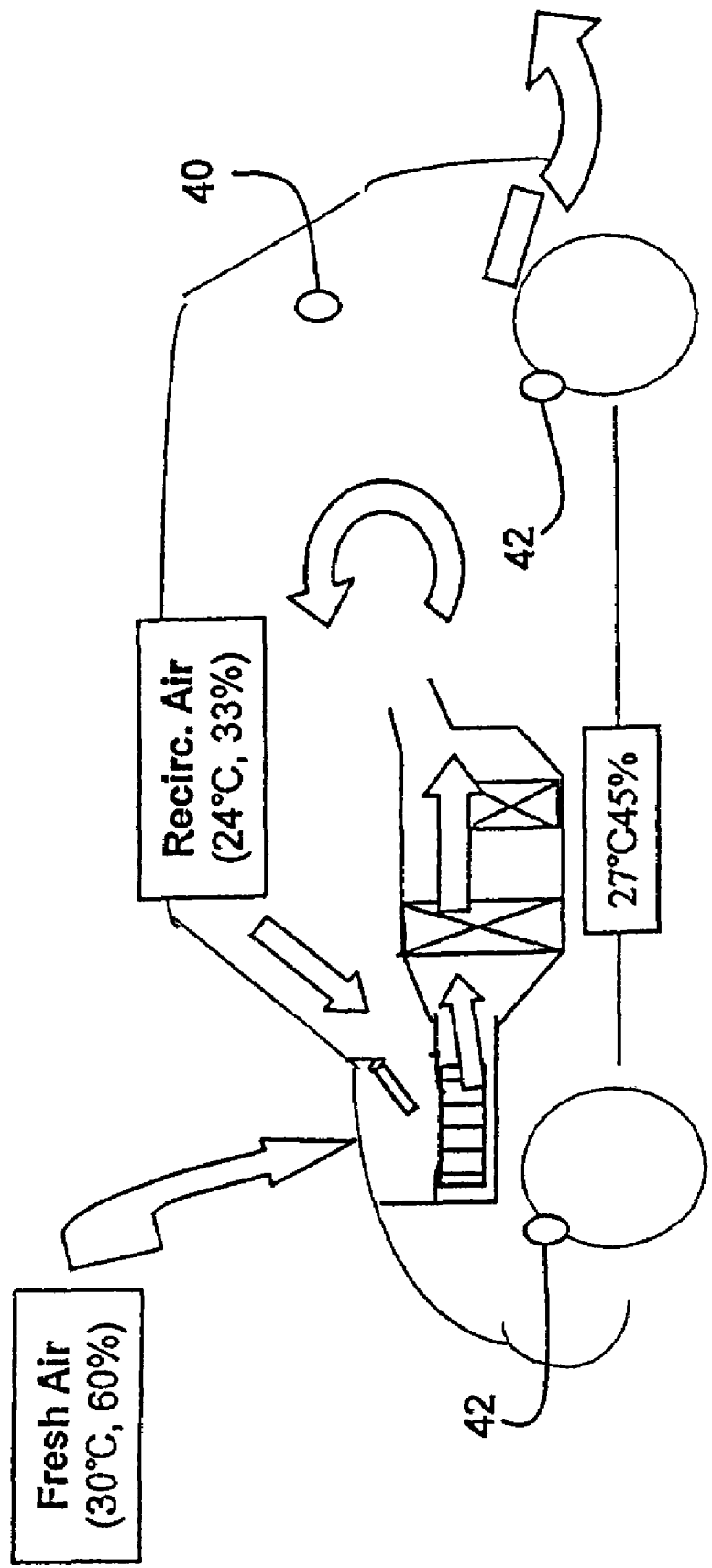
FIG. 3 is an illustration showing the general configuration of a vehicle with an air conditioning system operating in accordance with the present method.

The present method and apparatus can be especially advantageous on a hot, humid day. In an example as shown in FIG. 3, a quantity of fresh air may be brought in having a temperature of 30° C. and a relative humidity of 60%. A quantity of vehicle cabin air may be recirculated, having a temperature of 24° C. and a relative humidity of 33%.

Figure 4:
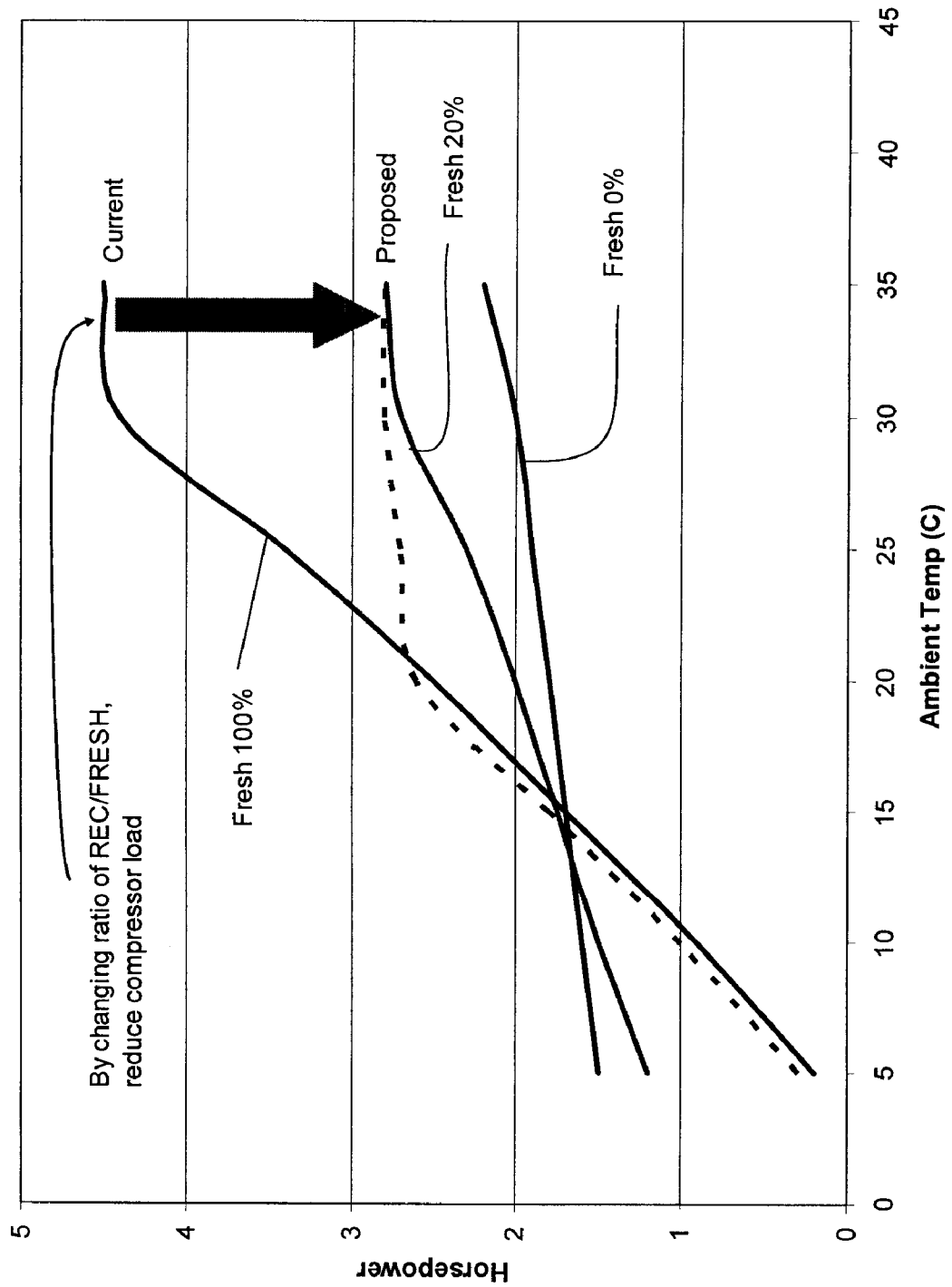
FIG. 4 is a graph depicting the energy savings available through the method of the present invention.

When these two air streams are mixed together in the blower case, the combined air stream has a temperature of 27° C. and a relative humidity of 45%. Vehicle temperature and humidity may be monitored with a sensor 40 for measuring one or both of cabin temperature and humidity. A sensor of this type is disclosed in U.S. Ser. Nos. 10/881,347 and 10/881,406, the disclosures of which are hereby incorporated by reference. Although the sensor 40 is shown in the rear of the cabin, the sensor 40 can be placed anywhere in the vehicle cabin, so as to measure the temperature and humidity distribution over the extent of the passenger area. Thus, the decrease of fresh air input into the system results in less work needing to be performed by the air conditioning system to maintain the cabin comfort level, with a resulting increase in fuel efficiency. The graph of FIG. 4 depicts the amount of horsepower consumed by the present method and apparatus as a function of ambient temperature. As indicated, a proposed level of about 20% fresh air would provide a desirable savings in horsepower over a range of ambient temperatures.

Figure 5:
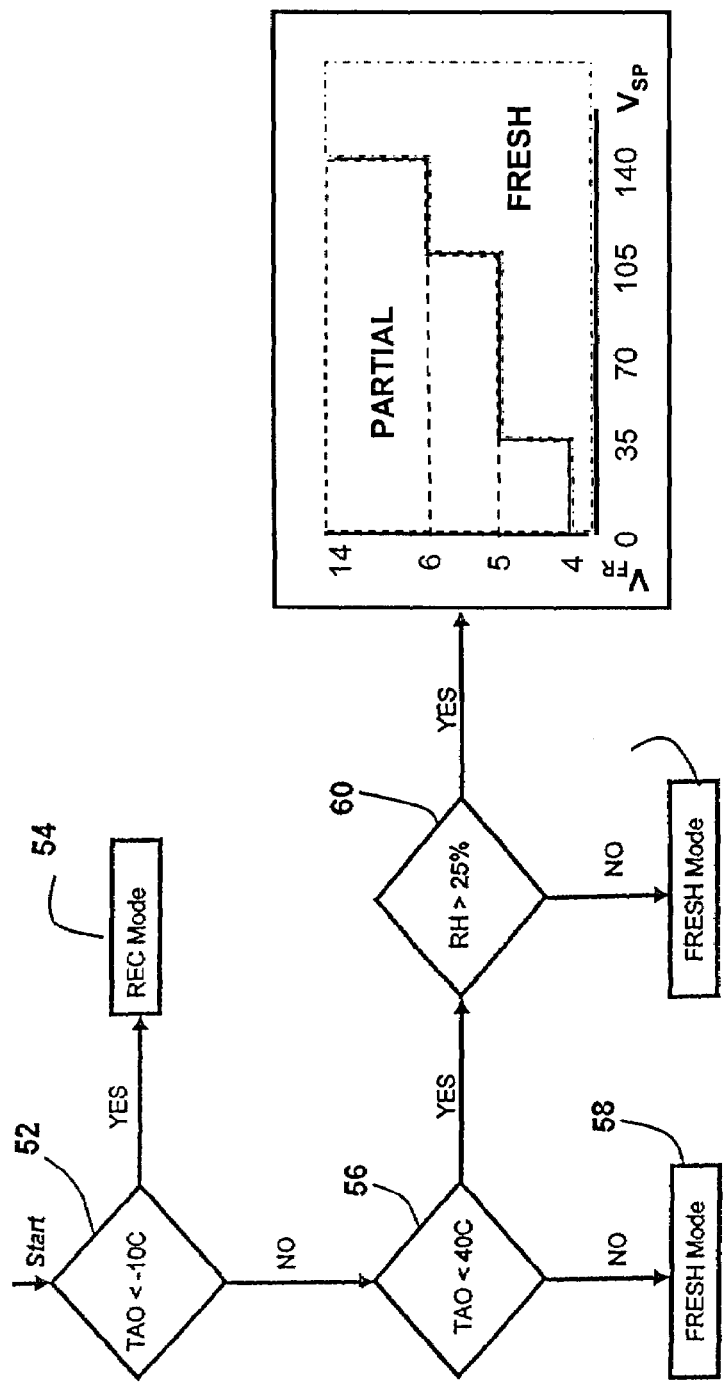
FIG. 5 is a control logic schematic depicting a method of controlling a mixture of fresh air and recirculated air in accordance with the present invention.

FIG. 5 shows a method of controlling the recirculation of air in the vehicle cabin to reduce compressor load in the vehicle air conditioning system. It should be appreciated that the present method can be enabled by any suitable implementation of hardware, software or firmware that could be used, without departing from the present invention.

Figure 6:
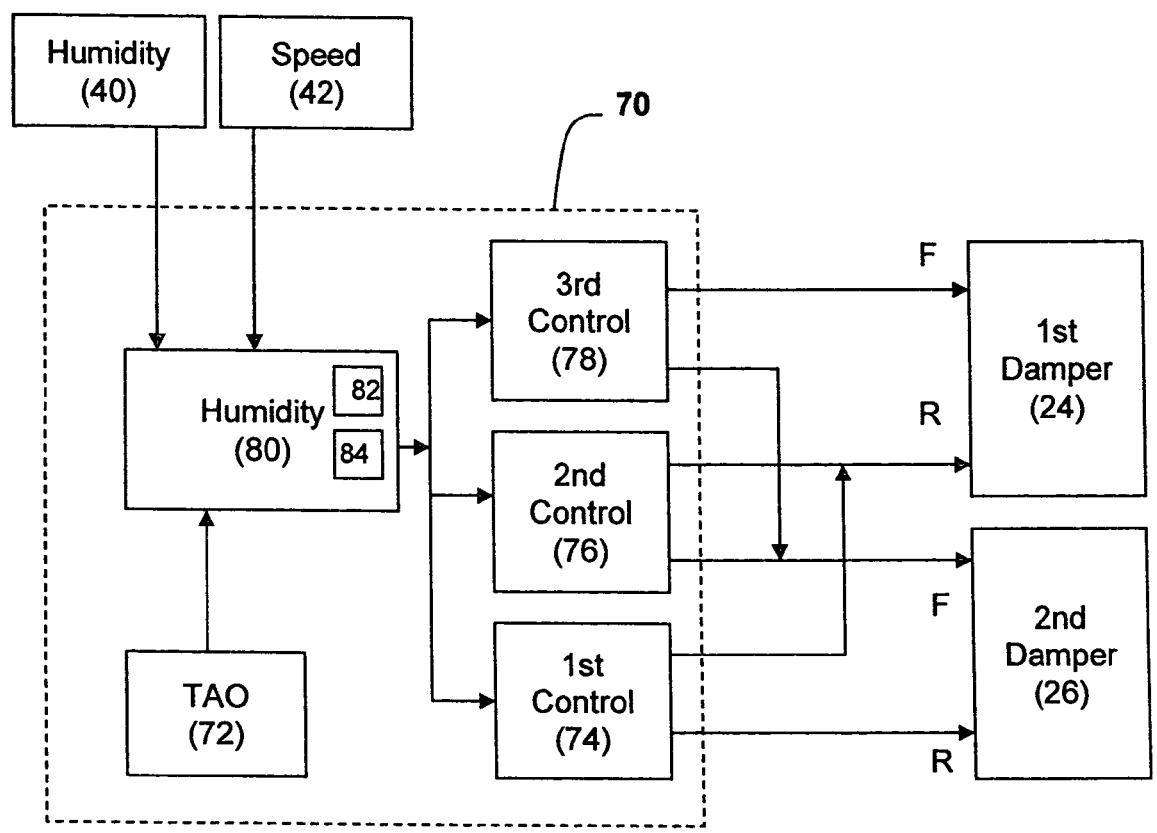
FIG. 6 is a block diagram indicating the general operation of the control system in accordance with the present invention.

A preferred computer-implemented control system 70 is shown in FIG. 6. The method includes the steps of calculating an outlet temperature, a "temperature at outlet" (TAO) of a vehicle air conditioning system, i.e. the temperature at the outlet of the air conditioning vents in the vehicle interior or cabin.

In this regard it is noted that TAO is a calculated value of outlet temperature, a term that is well known in the art and may be based upon a number of parameters, such as sensed cabin temperature, solar load, ambient temperature, etc., but is primarily based upon the desired cabin temperature setpoint input by the user. It is also known in the art that the calculated outlet temperature (TAO) is commonly used in the automatic mode of operation to control fan speed and vent selection. This control setting can be modified in some portions of the control system to provide for improved response, so as to help achieve a desired level of perceived comfort on the part of the driver and passengers in the vehicle cabin.

In the present method and control system, as shown in FIGS. 5 and 6, a calculating implementation 72 is used to calculate the outlet temperature. A determination is made whether the calculated outlet temperature is above a predetermined outlet temperature.

In step 52, if the calculated outlet temperature is below the predetermined outlet temperature, i.e. below −10° C., a first control implementation 74 moves the dampers 24, 26 to the recirculation position, cutting off fresh air and thereby permitting only the recirculation of the air in the vehicle cabin (FIG. 2A). On the other hand, if in step 52 TAO is found to be above the first predetermined temperature (i.e. −10° C.), then, in step 56, TAO is compared to a second predetermined temperature, which in this example is 40° C.

If the calculated outlet temperature (TAO) is above this second predetermined outlet temperature, a third control implementation 76 moves the dampers 24, 26 to the second or fresh position (step 58) so as to only introduce fresh air into the vehicle air conditioning system (FIG. 2C). On the other hand, if the measured outlet temperature is determined to be above the first predetermined outlet temperature but below the second predetermined outlet temperature, a second control implementation 78 moves the second damper 26 to a fresh position and selectively moves the first damper 24 to either the fresh position as above, or the recirculation position, so as to provide a mixture of fresh and recirculated air as shown in (FIG. 2B), in response to a predetermined environmental condition, preferably relative humidity. The relative humidity in the vehicle cabin is measured with the sensor 40, in step 60.

A humidity-responsive control implementation 80 is used to move the dampers 24, 26 in response to various humidity conditions. If, in step 60, measured relative humidity is determined to be below a predetermined level, i.e. 25%, the humidity-responsive control implementation 80 includes a first operative implementation 82 which, in step 59, moves dampers 24, 26 to the second or fresh position so that only fresh air is introduced into the vehicle air conditioning system. If in step 60 the measured relative humidity is determined to be above the predetermined level, the humidity-responsive control implementation 80 includes a second operative implementation 84 that controls the position of the dampers 24, 26 based upon vehicle speed and blower motor voltage, as shown in the graph of step 62.

More specifically, a PARTIAL region 64 is established where partial recirculation is enabled for a range of vehicle speeds and blower voltages corresponding user air conditioning set points. In the PARTIAL region 64 the first damper 24 is in the recirculation position while the second damper 26 is in the fresh position. A FRESH region 66 is established for a range of blower voltages and vehicle speeds where only fresh air is introduced, whereby both dampers 24, 26 are in the fresh position.

In this way, the present method and system allows a tight control over fresh air inflow into the vehicle air conditioning system. In this way, the present method and system are able to reduce the load on the air conditioning compressor and the vehicle engine, without degrading perceived comfort. Therefore, the present method and system enables an increase in fuel efficiency under a range of driving conditions.

As described hereinabove, the present invention solves many problems associated with previous type devices. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. A method of controlling recirculation of air in a vehicle cabin to reduce compressor load in a vehicle air conditioning system, comprising the steps of:

measuring relative humidity within the vehicle cabin;

measuring a speed of the vehicle;

calculating an outlet temperature of the vehicle air conditioning system;

determining whether the calculated outlet temperature is above one of a first predetermined outlet temperature and a second predetermined outlet temperature, the second predetermined outlet temperature being higher than the first predetermined outlet temperature;

recirculating air in the vehicle cabin through the air conditioning system when the calculated outlet temperature is below the first predetermined outlet temperature;

introducing fresh air into the vehicle air conditioning system and recirculating air from the vehicle cabin through the vehicle air conditioning system in response to the measured vehicle speed, when the calculated outlet temperature is above the first predetermined outlet temperature and below the second predetermined outlet temperature, and the measured relative humidity is above a predetermined level;

introducing only fresh air into the vehicle air conditioning system when the calculated outlet temperature is above the first predetermined outlet temperature and below the second predetermined outlet temperature, and the measured relative humidity is below the predetermined level; and introducing only fresh air into the vehicle air conditioning system when the calculated outlet temperature is above the second predetermined outlet temperature.

2. The method claim 1, wherein the step of introducing fresh air into the vehicle air conditioning system and recirculating air from the vehicle cabin through the vehicle air conditioning system in response to the measured vehicle speed comprises one of:

introducing both fresh air and recirculated cabin air into the vehicle air conditioning system; and introducing only fresh air into the vehicle air conditioning system.

3. A method of controlling air circulation in a blower case in a vehicle air conditioning system to reduce compressor load, comprising the steps of:

calculating an outlet temperature of the vehicle air conditioning system;

determining whether the calculated outlet temperature is above one of a first predetermined outlet temperature and a second predetermined outlet temperature, the second predetermined outlet temperature being higher than the first predetermined outlet temperature;

opening a first damper and a second damper to a recirculation position so as to recirculate vehicle cabin air into the blower case when the calculated outlet temperature is below the first predetermined outlet temperature;

opening both the first and second dampers to a fresh position that introduces only fresh air into the blower case when the calculated outlet temperature is above the second predetermined outlet temperature; and opening one of the first damper and the second damper to the fresh position and selectively opening the other of the first and second dampers to one of the fresh position and the recirculation position, so as to selectively introduce either only fresh air or a mixture of fresh and recirculated vehicle cabin air into the blower case, in response to an at least one predetermined condition when the calculated outlet temperature is above the first predetermined outlet temperature, but below the second predetermined outlet temperature.

4. The method of claim 3, wherein the at least one predetermined condition includes humidity and, when the calculated outlet temperature is above the first predetermined outlet temperatures, but below the second predetermined outlet temperature, performing the additional steps of:

measuring the relative humidity within the vehicle cabin;
measuring a speed of the vehicle;
opening both the first and second dampers to the fresh position, to introduce only fresh air into the vehicle air conditioning system when the measured relative humidity is below a predetermined level; and
opening at least one of the first and second dampers to the fresh position to introduce fresh air into the vehicle air conditioning system in response to the measured vehicle speed when the measured relative humidity is above the predetermined level.

5. The method of claim 4, wherein the step of opening at least one of the first and second dampers to the fresh position, further comprises one of:

opening one of the first damper and the second damper to the fresh position for introduction of fresh air from outside the vehicle into the vehicle air conditioning system, and opening the respective other of the first damper and second damper to the recirculation position, so as to recirculate at least a remainder of vehicle cabin air into the vehicle air conditioning system in response to a first predetermined vehicle speed; and
opening both the first and second dampers to the fresh position, for introducing only fresh air into the vehicle air conditioning system in response to a second predetermined vehicle speed.

6. A blower system for a vehicle air conditioning system, comprising:

a blower case for receiving air to be circulated into a vehicle cabin;
first and second dampers, each of said dampers being selectively movable between a recirculation position for recirculating vehicle cabin air into the blower case and a fresh position for introducing fresh air from outside the vehicle into the blower case; and a control system for moving the first and second dampers individually between the recirculation and fresh positions in response to a calculated outlet temperature, wherein the control system comprises:
a calculating implementation for calculating the outlet temperature of the vehicle air conditioning system;
a first control implementation for moving each of the first and second dampers to the recirculation position when the calculated outlet temperature is below a first predetermined outlet temperature;
a second control implementation for moving one of the first and second dampers to the fresh position, and for selectively moving the other of the first and second dampers to the fresh position or the recirculation position, in response to a predetermined environmental condition, wherein the predetermined environmental condition is not the first or second predetermined outlet temperature; and
a third control implementation for opening both the first and second dampers to the fresh position when the calculated outlet temperature is above the second predetermined outlet temperature.

7. The blower system of claim 6, further comprising:
a humidity sensor for measuring relative humidity within the vehicle cabin and generating a respective humidity signal, wherein the predetermined environmental condition is humidity;
a speed sensor for measuring a speed of the vehicle and generating a vehicle speed signal; and
a humidity-responsive control implementation for receiving the humidity signal and the speed signal, and operative at the calculated outlet temperatures between the first and second predetermined outlet temperatures, wherein the humidity-responsive control implementation further comprises:
a first operative implementation determining when the measured relative humidity is below a predetermined level, and activating the third control implementation for opening the first and second dampers to the fresh position so as to introduce only fresh air into the vehicle air conditioning system; and
a second operative implementation determining when the measured relative humidity is above the predetermined level, and activating the second control implementation for opening at least one of the first and second dampers to the fresh position, for introducing at least a portion of fresh air into the vehicle air conditioning system in response to the measured vehicle speed.

8. The blower system of claim 7, wherein the second operative implementation includes:
a first speed responsive implementation for activating the second control implementation in response to a first predetermined speed; and
a second speed responsive implementation for activating the third control implementation in response to a second predetermined speed.

9. The blower system of claim 6, wherein the blower case further comprises:
a first access port for directing a first air stream into the blower case;
a second access port for directing a second air stream into the blower; and
a sealing member between the first and second access ports for providing fluid separation between the first and second air streams.

10. The blower system of claim 9, wherein the first damper regulates access to the first access port between the recirculation position and the fresh position, and wherein the second damper regulates access to the second access port between the recirculation position and the fresh position.

11. The blower system of claim 9, wherein one of the first and second access ports is configured so as to be a primary recirculated air port, and wherein the respective other of the first and second access ports is configured so as to be a primary fresh air port.

12. The blower system of claim 11, wherein the primary recirculated air port is larger than the primary fresh air port in cross-sectional area to allow a greater flow of recirculated air than fresh air into the blower case.

13. The blower system of claim 6, wherein the first and second dampers are each movably mounted to the blower case for selectively varying between the recirculation and fresh positions.

* * * * *